UNITED STATES PATENT OFFICE.

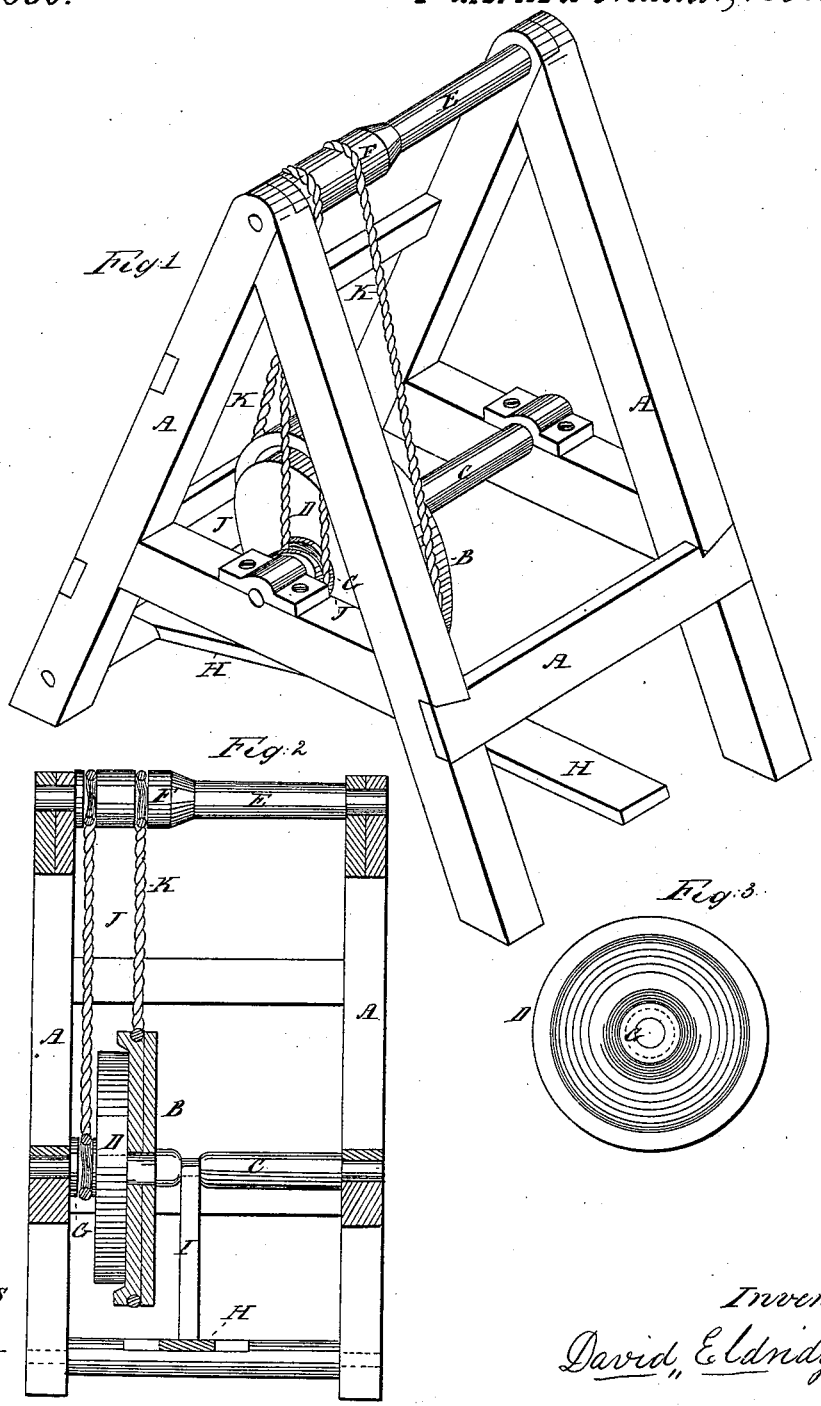

DAVID ELDRIDGE, OF PHILADELPHIA, PENNSYLVANIA.

IMPROVEMENT IN FLY-WHEELS.

Specification forming part of Letters Patent No. 46,890, dated March 21, 1865; antedated March 6, 1865.

*To all whom it may concern:*

Be it known that I, DAVID ELDRIDGE, of the city and county, of Philadelphia, and State of Pennsylvania, have invented a new Improvement in Constructing and Hanging Fly-Wheels; and I do hereby declare that the following is a full and exact discription thereof, reference being had to the accompanying drawings, making a part of this specification, in which—

Figure 1 is a perspective view, Fig. 2, a vertical section, Fig. 3 a side view, of fly-wheel.

A represents the frame, B the driving-wheel, $d$ arbor of the driving-wheel, D the fly-wheel, E the arbor driven, F the pulley on the driven arbor, G the pulley on the hub of the fly-wheel, H the treadle, I the pitman, J and K two belts or cords.

The nature of my invention and improvement consists in arranging a fly-wheel on the driving-shaft or on an independent shaft or centers and connecting it with a wheel or pulley on a driven shaft in such a manner as to get a greater velocity to the fly-wheel than that given to the driving-wheel, for the purpose of increasing the momentum of the former beyond what it would have if arranged in the usual manner, and consequently running at a lower velocity than it attains by the improved arrangement.

To enable others skilled in the art to make and use my invention, I will proceed to describe its construction and operation.

When economy in room is desirable, it will be best to construct the driving-wheel B with a flange that surrounds the fly-wheel D. The fly-wheel D must be so constructed that the hub will extend out on one side far enough beyond the line of the rim or flange of the driving-wheel B to form a pulley, G, which is connected with the pulley F on the driven shaft or arbor E by means of the belt J. The said fly-wheel is represented in the drawings as placed loosely upon the driving-shaft C; but the same result may be attained by placing it on an independent shaft or centers, when connected with the driven shaft substantially as described. The weight and size of the fly-wheel must be determined by its manner of application.

I have represented the connection of the fly-wheel with the driven shaft or arbor as effected by means of a belt and pulleys, yet it will clearly appear that the same result would be accomplished when practicable by means of cog-wheels.

The friction caused by the fly-wheel running loose upon the shaft C is perhaps less than it would be if running in boxes, as it turns in the same direction with the shaft.

What I claim as my invention, and desire to secure by Letters Patent, is—

The combination of the flanged wheel B, fly-wheel D, pulleys F and G, belts J and K, and treadle H, or its equivalent, arranged to operate substantially as described.

DAVID ELDRIDGE.

Witnesses:
   STEPHEN USTICK,
   JOHN WHITE.